United States Patent
Balasubramanian et al.

(10) Patent No.: US 9,262,546 B2
(45) Date of Patent: Feb. 16, 2016

(54) WEB BROWSER ADAPTED TO RENDER A WEB PAGE BASED ON AN IDENTITY AND A TYPE OF PROGRAM WITHIN WHICH A HYPERLINK WAS SELECTED

(71) Applicant: International Business Machines Corporation, Armonk, NY (US)

(72) Inventors: Swaminathan Balasubramanian, Southfield, MI (US); Rick A. Hamilton, II, Charlottesville, VA (US); Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 13/684,688

(22) Filed: Nov. 26, 2012

(65) Prior Publication Data

US 2014/0149834 A1      May 29, 2014

(51) Int. Cl.
*G06F 17/30* (2006.01)

(52) U.S. Cl.
CPC ...... *G06F 17/3089* (2013.01); *G06F 17/30893* (2013.01)

(58) Field of Classification Search
None
See application file for complete search history.

(56) References Cited

U.S. PATENT DOCUMENTS

| | | | |
|---|---|---|---|
| 6,282,703 B1 | 8/2001 | Meth et al. | |
| 7,155,493 B1 * | 12/2006 | Weber | 709/218 |
| 2006/0031417 A1 | 2/2006 | Narin | |
| 2007/0162460 A1 | 7/2007 | Long | |
| 2009/0128843 A1 * | 5/2009 | Lao | G06F 3/1205 358/1.15 |
| 2009/0265716 A1 | 10/2009 | Prashanth | |
| 2010/0192224 A1 * | 7/2010 | Ferri | G06F 21/53 726/23 |
| 2010/0229081 A1 | 9/2010 | Rothbucher | |
| 2011/0078203 A1 | 3/2011 | Cohen et al. | |
| 2013/0067473 A1 * | 3/2013 | Olson et al. | 718/100 |

OTHER PUBLICATIONS

Wood, Alan; "Enabling and disabling JavaScript"; Jun. 25, 2011; retrieved from http://alanwood.net/demos/enabling-javascript.html.*

* cited by examiner

*Primary Examiner* — Scott Baderman
*Assistant Examiner* — Asher Kells
(74) *Attorney, Agent, or Firm* — Isaac J. Gooshaw

(57) ABSTRACT

Exemplary embodiments of the present invention disclose a method and system for configuring a web browser executing in a computer to render a web page for display at the computer. A first hyperlink request is received from a first program executing in the computer to obtain and render a first web page corresponding to the first hyperlink. In response, the web browser obtains the first web page, and renders the first web page according to a first set of web page configuration parameters. A second hyperlink request is received from a second program executing in the computer to obtain and render a second web page corresponding to the second hyperlink. In response, the web browser obtains the second web page, and renders the second web page according to a second set of web page configuration parameters that differs in part from the first set of web page configuration parameters.

17 Claims, 3 Drawing Sheets

WEB BROWSER ADAPTED TO RENDER A WEB PAGE BASED ON AN IDENTITY AND A TYPE OF PROGRAM WITHIN WHICH A HYPERLINK WAS SELECTED

FIELD OF THE INVENTION

The present invention relates generally to web browsers, and more specifically to adapting a response of a web browser.

BACKGROUND OF THE INVENTION

Much of today's communications, entertainment, and information search and retrieval activities involve the Internet, a global network of computers, communications links, and protocols. Web browser applications were originally designed as user-friendly portals to the Internet's resources and functionality that facilitated Internet navigation and information search, but have since evolved into more sophisticated and complex software applications. Web browser applications now incorporate sophisticated security and multimedia rendering functions (video, audio, imaging, etc.) and enable a user to navigate and interact dynamically with connected web sites and other Internet users.

Web browsers can be invoked by applications (e.g., word processors, email applications, instant messaging, etc.) or by an operating system to render content or to provide functionality. The invocation of browsers may occur via the activation of anchor links (hyperlinks) that are often embedded in Hyper Text Markup Language (HTML) documents (web pages) and other displayed material. Hyperlinks may display as highlighted or underlined text to a user but can contain embedded uniform resource locators or URLs, which are the addresses of Internet resources on the World Wide Web, e.g., a web page that is on a web site. When a user activates a hyperlink, often by clicking on the hyperlink with a mouse, a web browser is invoked and passed a URL that is embedded in the hyperlink as a parameter during the invocation. A prefix to the URL is a Uniform Resource Identifier (URI) which specifies how the URL is interpreted. A common URI contains a character string "http" which identifies the URL as a resource to be retrieved over the Hypertex Transfer Protocol (HTTP). Other common prefixes are "https" (for Hypertext Transfer Protocol Secure), "ftp" (for File Transfer Protocol), and "file" (for files that are stored locally on a user's computer). If a URL points to a web site, which is often a case, the web browser uses the URL to access the web site and render content at the web site in accordance with the configuration that a user has assigned to the web browser.

A web browser's configuration describes the optional behaviors available to the web browser and is often stored in a web browser configuration table that is accessed by the web browser during each invocation of the web browser. For example, often a web browser may be configured to display or to not display images, to enable or to disable JavaScript® scripting language execution, to use a specific search engine, to block accesses to specific web sites, to remember web site passwords, to use a specific application to play video or to play audio, or to use a specific Internet connection, among other options. A web browser's configuration remains constant until changed by a user.

SUMMARY

Exemplary embodiments of the present invention disclose a method and system for configuring a web browser executing in a computer to render a web page for display at the computer. A first hyperlink request is received from a first program executing in the computer to obtain and render a first web page corresponding to the first hyperlink. In response, the web browser obtains the first web page, and renders the first web page according to a first set of web page configuration parameters. A second hyperlink request is received from a second program executing in the computer to obtain and render a second web page corresponding to the second hyperlink. In response, the web browser obtains the second web page, and renders the second web page according to a second set of web page configuration parameters that differs in part from the first set of web page configuration parameters.

DETAILED DESCRIPTION

A preferred embodiment of the present invention is now described in detail with reference to the figures. Herein user refers to a user that is a human and/or a user that is a program.

Figure 1:
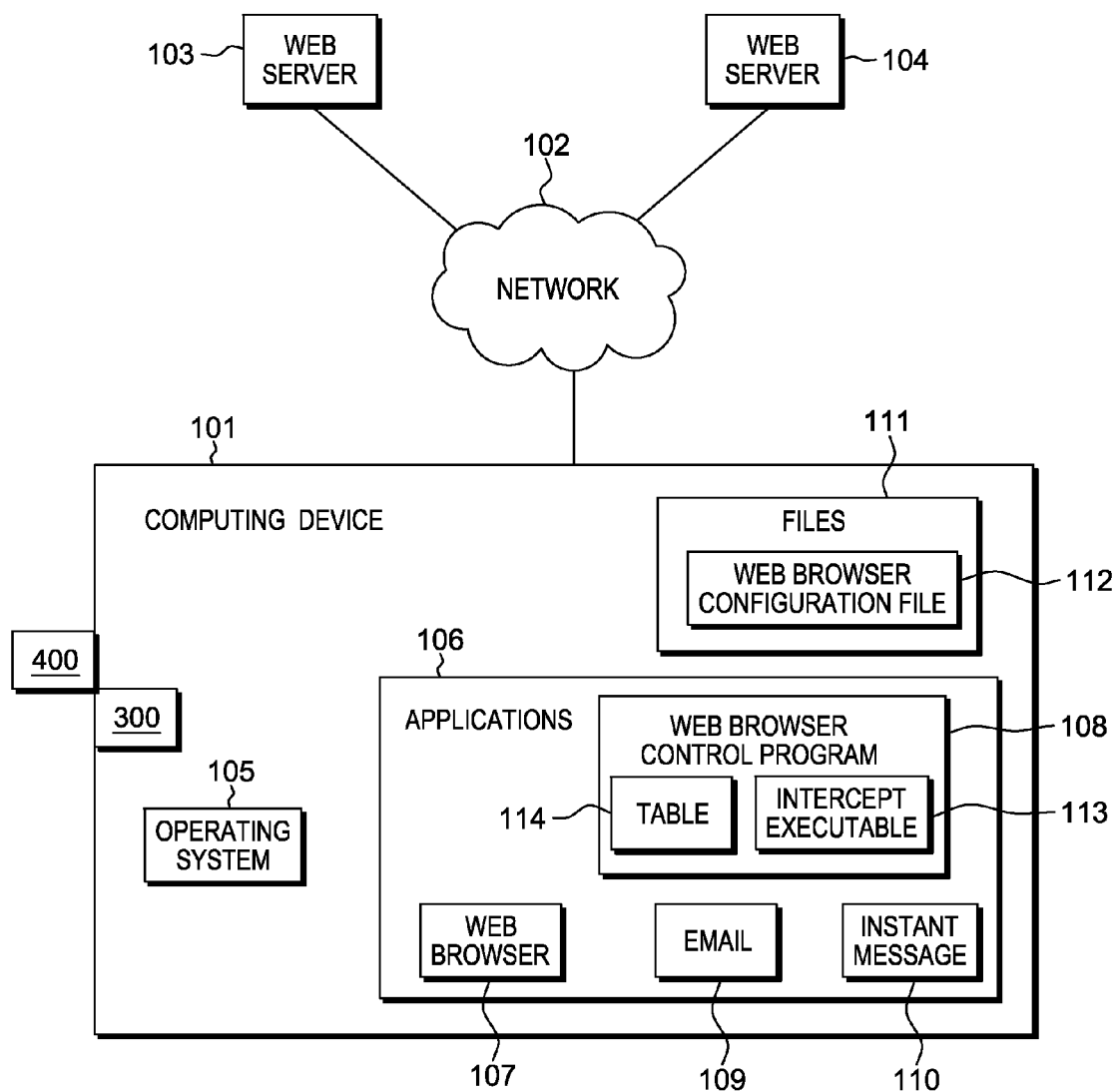
FIG. 1 is a block diagram of a web browser on a computing system, in accordance with an embodiment of the present invention.

FIG. 1 depicts a computing device 101 connected to a network 102 that hosts an Internet. Computing device 101 may be a general purpose desktop, laptop, or tablet computing device or be incorporated into a cell phone, TV, or other device. Network 102 may be a connection matrix, such as the Internet, for a plurality of web servers that host web pages, documents, video, audio, and a spectrum of informational resources. Web servers 103 and 104 are connected to network 102. Computing device 101 executes an operating system 105 and applications 106 that include web browser 107, web browser control program 108, email application 109, and instant message application 110 that may access information on the web servers 103 and 104. A web browser 107 is an application that provides a user of computing device 101 with connection, navigation, security, and multimedia rendering functions (video, audio, imaging, etc.), among other functions, that enable a user to interact with connected web sites hosted on servers 103 and 104 and other users connected to network 102.

A configuration file 112 for web browser 107 specifies certain characteristics that affect a rendering of a web page, but do not change based on an identity or type of a program in which a hyperlink is selected. In addition, a web browser control program 108 determines other, variable configuration characteristics for web browser 107 that are based on the identity or type of a program within which a hyperlink is selected. Before web browser 107 is invoked, web browser control program may alter configuration file 112 based on the identity or type of a program within which a hyperlink is selected. Web browser 107 accesses configuration file 112 during each invocation of the web browser 107.

In exemplary embodiments, a web browser control program 108 monitors the identity or type of program through which a user requested a web page, by specifying a hyperlink. Based on the identity or type of program requesting the web page, control program 108 determines and provides the variable configuration characteristics to the web browser configuration file 112. For example, the web browser control program 108 provides one set of variable configuration parameters when a user requests a web page through instant message program 110 and a different set of variable configuration parameters when a user requests a web page through email program 109. For example, if the instant message program 110 requested a web page, web browser control program 108 may enable image loading and disable JavaScript® scripting language execution. However, if the e-mail program 109 requested a web page, web browser control program 108 may disable image loading and enable JavaScript® scripting language execution. However, other factors may affect the variable configuration parameters such as an identity of a computer user, information associated with the web browser invoking program (e.g., email address lists and an email sender's domain), time of day, day of week, identities of applications currently executing on a computer, and a content of a URL passed to the web browser.

In exemplary embodiments, web browser control program 108 may be configured by a user with a plurality of web browser configurations. When the web browser control program is executing, the web browser control program monitors applications that are executing on a computer. When a hyperlink is selected in an application, called an invoking application or an invoker, web browser control program 108 intercepts an invocation of a web browser 107, identifies an invoking application such as instant message program 110 or e-mail program 109, and provides the web browser 107 with a configuration that is adapted to a behavior a user desires the web browser 107 to have when a hyperlink is activated in an invoking application. Web browser control program 108 substitutes an adapted configuration for a configuration the web browser would have accessed by default during an invocation. An adapted web browser configuration, and consequently an adapted web browser behavior, may be defined by a user within web browser control program 108 for each of a plurality of invoking applications, such as e-mail application 109 and instant message application 110. After an adapted configuration is substituted for a default configuration by web browser control program 108, the web browser 107 is invoked by web browser control program 108. The web browser 107 reads the adapted configuration, and therefore the web browser 107 executes with a behavior a user desires.

The user may start web browser control program 108 manually or web browser control program 108 may be started by operating system 105 when a user logs onto computing device 101. Once started, web browser control program 108 may be configured at any time by a user. A configuration of web browser control program 108 includes a table of configurations 114 of web browser 107 that are adapted by a user for use with each of a plurality of applications 106 that may invoke web browser 107, for example e-mail application 109 and instant message application 110.

Figure 2:
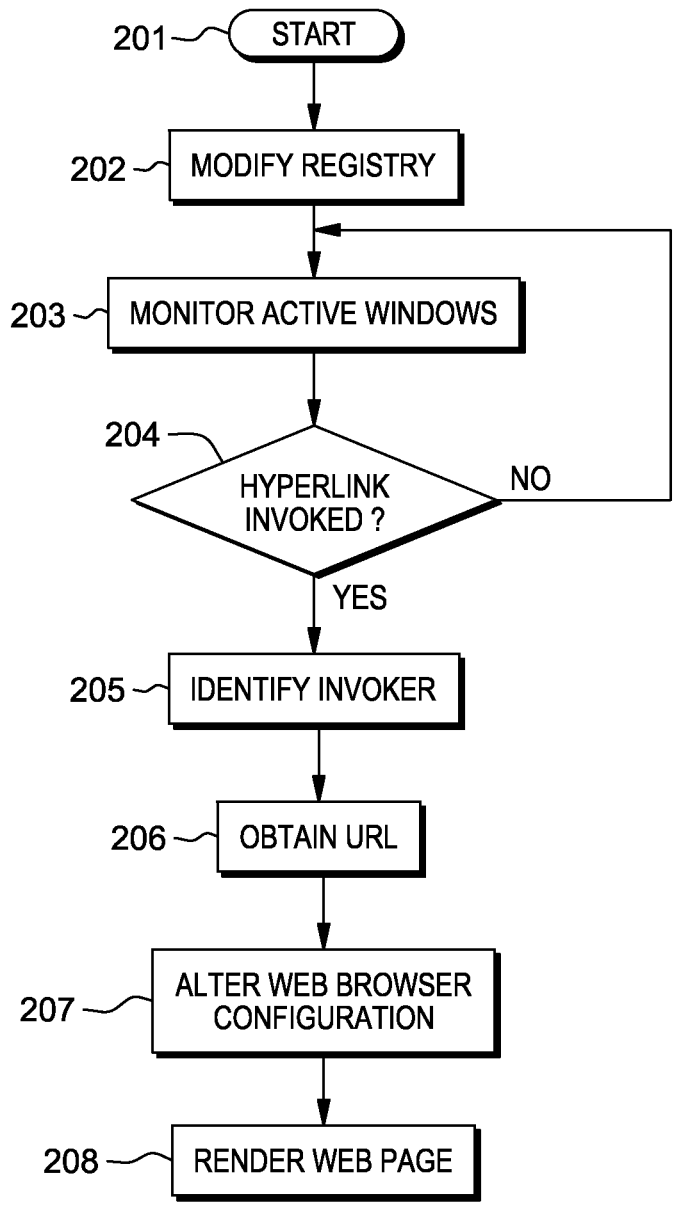
FIG. 2 is a diagram of a web browser control program in operation, in accordance with an embodiment of the present invention.

FIG. 2 is a flow chart of the exemplary embodiment of web browser control program 108 that personalizes a behavior of a web browser when a hyperlink is activated. Web browser control program 108 begins execution in step 201. In step 202, web browser control program 108 substitutes in a Windows® registry, a pointer to intercept executable 113, a component of web browser control program 108, in place of a pointer to web browser executable 107. After the substitution, the operating system invokes intercept executable 113 instead of web browser 107 and passes a URL to the intercept executable 113 when a hyperlink is activated. The function of the intercept executable 113 is to pass the URL to web browser control program 108 and by doing so, alert web browser control program 108 that a hyperlink has been selected.

In step 203, web browser control program 108 begins recording an identity of an application that is associated with a currently active window on computing device 101. In exemplary embodiments, the recording occurs at a sufficient rate such that a user cannot cause a new window to become active and activate a hyperlink in a new active window before an identity of the new active window is recorded. There is only one active window at any time on a computer system that is running a Microsoft Windows® operating system for a single user. A hyperlink must be in an application that is in an active window to be activated.

In step 204, web browser control program 108 determines whether a hyperlink has been selected, and if not, continues to monitor and record an identity of an application that is associated with a currently active window on computing device 101. If a hyperlink has been selected, web browser control program 108 identifies an invoker in step 205. Since web browser control program 108 is recording an identity of an application in an active window and because a hyperlink must be activated in the active window, web browser control program 108 identifies the invoker as an identity of an application in a most recent active window. For example, if a hyperlink is activated in email application 109, the invoker is identified as the email application 109.

In step 206, web browser control program 108 obtains a URL of a hyperlink from intercept executable 113. Web browser control program 108 looks for the invoker in an internal table 114 of invokers. A web browser configuration is associated with each invoker in the table 114. If an invoker is found in the table 114, web browser control program 108 substitutes an associated configuration specified in the table 114 for a web browser's default configuration in configuration file 112 in step 207.

Web browser control program 108 invokes the web browser 107 and passes the URL to the web browser 107 during the invocation of the web browser 107. The web browser 107 reads the configuration file 112 and begins operation using options specified in the configuration file 112. The web browser 107 accesses content at a location specified by the URL, and renders the content in accordance to the options specified in the configuration file 112. For example, if a hyperlink had been activated in an email application 109, and a configuration table 114 in web browser control program 108 specifies that no images are rendered if an invoker is the email application 109, but JavaScript® scripting language is enabled, the web browser 107 would be invoked, read a configuration file 112 that had been altered by web browser control program 108, fetch content at a location specified in a URL, and not render images but execute any JavaScript® scripting language loaded from the location. If a hyperlink had been activated in an instant message application 110, and a configuration table 114 in web browser control program 108 specifies that images are rendered if an invoker is instant message application 110, but JavaScript® scripting language is disabled, the web browser 107 would be invoked, read a configuration file 112 that had been altered by web browser control program 108, fetch content at a location specified in a URL, and render images but not execute any JavaScript® scripting language loaded from the location. The configuration of the web browser is therefore adapted to an invoker.

If an invoker is not found in an internal table 114, web browser control program 108 invokes the web browser 107 and passes a URL to the web browser 107. The web browser 107 reads configuration file 112 that has not been altered by web browser control program 108, accesses content at the location specified by the URL, and renders the content in accordance to the options specified in the configuration file 112.

In another exemplary embodiment, web browser 107 includes the entire functionality of web browser control program 108, and in this instance, web browser control program 108 is not a program that is separate from web browser 107.

Figure 3:
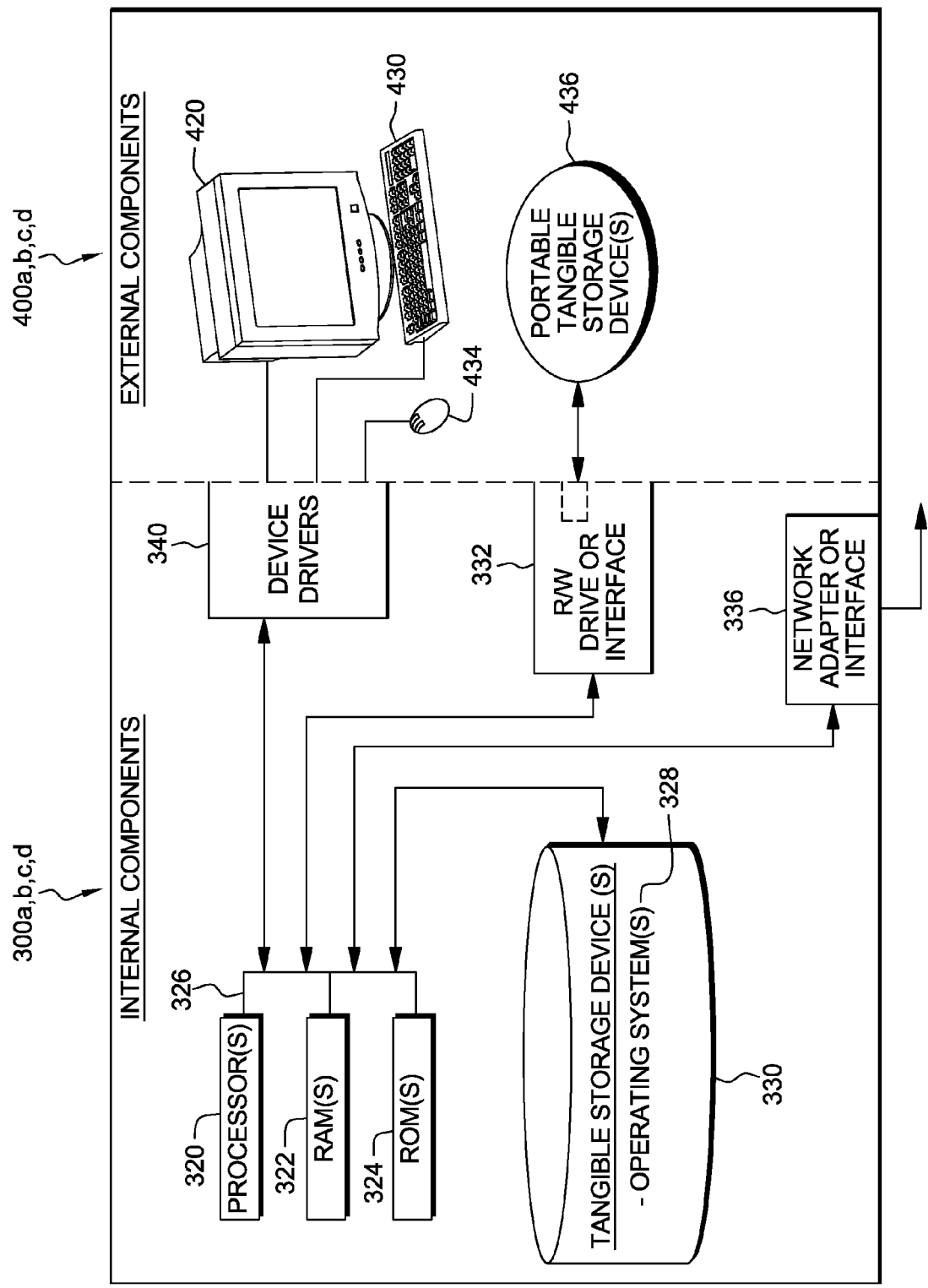
FIG. 3 depicts a block diagram of components of a computing device, in accordance with an embodiment of the present invention.

Computing/processing device 101 includes respective sets of internal components 300a,b,c and external components 400a,b,c, illustrated in FIG. 3. Each of the sets of internal components 300a,b,c includes one or more processors 320, one or more computer-readable RAMs 322 and one or more computer-readable ROMs 824 on one or more buses 326, one or more operating systems 328 and one or more computer-readable tangible storage devices 330. The one or more operating systems 328 and programs 105 (for computer 101 are stored on one or more of the respective computer-readable tangible storage devices 330 for execution by one or more of the respective processors 320 via one or more of the respective RAMs 322 (which typically include cache memory). In the illustrated embodiment, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store but does not propagate a computer program and digital information.

Each set of internal components 300a,b,c also includes a R/W drive or interface 332 to read from and write to one or more portable computer-readable tangible storage devices 436, that do not propagate signals, such as a CD-ROM, DVD, memory stick, magnetic tape, magnetic disk, optical disk or semiconductor storage device. Programs 105 can be stored on one or more of the respective portable computer-readable tangible storage devices 436, read via the respective R/W drive or interface 332 and loaded into the respective hard drive or computer-readable tangible storage device 330.

Each set of internal components 300a,b,c also includes a network adapter or interface 336 such as a TCP/IP adapter card or wireless communication adapter (such as a 4G wireless communication adapter using OFDMA technology). Programs 105 can be downloaded to the respective computing/processing devices from an external computer or external storage device via a network (for example, the Internet, a local area network or other, wide area network or wireless network) and network adapter or interface 336. From the network adapter or interface 336, the programs are loaded into the respective hard drive or computer-readable tangible storage device 330. The network may comprise copper wires, optical fibers, wireless transmission, routers, firewalls, switches, gateway computers and/or edge servers.

Each of the sets of external components 400a,b,c includes a display screen 420, a keyboard or keypad 430, and a computer mouse or touchpad 434. Each of the sets of internal components 300a,b,c also includes device drivers 340 to interface to display screen 420 for imaging, to keyboard or keypad 430, to computer mouse or touchpad 434, and/or to display screen for pressure sensing of alphanumeric character entry and user selections. The device drivers 340, R/W drive or interface 332 and network adapter or interface 336 comprise hardware and software (stored in computer-readable tangible storage device 330 and/or ROM 324).

The programs can be written in various programming languages (such as Java, C, C++) including low-level, high-level, object-oriented or non object-oriented languages. Alternatively, the functions of the programs can be implemented in whole or in part by computer circuits and other hardware (not shown).

Based on the foregoing, a computer system, method and program product have been disclosed for configuring a web browser executing in a computer to render a web page for display at the computer. However, numerous modifications and substitutions can be made without deviating from the scope of the present invention. Therefore, the present invention has been disclosed by way of example and not limitation.

What is claimed is:

1. A method for configuring a web browser executing in a computer to render a web page for display at the computer, the method comprising the steps of:
receiving a first hyperlink request from a first program executing in the computer to obtain and render a first web page corresponding to the first hyperlink, and in response, obtaining the first web page, and rendering the first web page according to a first set of web page configuration parameters, wherein one or more configuration parameters of the first set of web page configuration parameters are altered based on one or both of an identity and a type of the first program within which the first hyperlink was selected;
receiving a second hyperlink request from a second program executing in the computer to obtain and render a second web page corresponding to the second hyperlink, and in response, obtaining the second web page, and rendering the second web page according to a second set of web page configuration parameters, the second set of web page configuration parameters differing in part from the first set of web page configuration parameters in a manner which affects display of the second web page, wherein one or more configuration parameters of the second set of web page configuration parameters are altered based on one or both of an identity and a type of the second program within which the second hyperlink was selected, and wherein the first hyperlink request and the second hyperlink request are received by a web browser control program that configures a web browser based on one or both of an identity of and a type of an application that originates the hyperlink request; and
substituting a pointer to a component of the web browser control program for a pointer to a web browser that is included in an operating system registry of the computer.

2. The method of claim 1 wherein:
the first program is an instant message program, and the first set of web page configuration parameters specify that image loading is enabled and a scripting language is disabled; and
the second program is an e-mail program, and the second set of web page configuration parameters specify that image loading is disabled and the scripting language is enabled.

3. The method of claim 1, wherein: one or both of the identity and the type of the first program and the second program are monitored by a third program executing in the computer.

4. The method of claim 1, the method including:
configuring one or both of the first set of web page configuration parameters and the second set of web page configuration parameters based, at least in part, on one or more of an identity of a computer user, a list of email addresses, a domain of an email sender, a time of day, a day of week, and an associated content of a hyperlink that has been requested by activation of that hyperlink.

5. The method of claim 1, the method including:
after the substitution, invoking the component of the web browser control program instead of the web browser; and
passing a URL to the web browser control program when a hyperlink is activated.

6. The method of claim 5, wherein: passing a URL to the web browser control program when a hyperlink is activated notifies the web browser control program that a hyperlink has been selected.

7. The method of claim 1, the method including:
recording an identity of an application that is associated with a currently active window on the computer, wherein the recording occurs at a sufficient rate such that a user cannot activate a hyperlink in a new active window before an identity of the new active window is recorded.

8. The method of claim 1, the method including:
identifying an identity of an application in a most recent active window based, at least in part, on both of an identity of an application in an active window and a hyperlink being activated in the active window.

9. The method of claim 8, the method including:
searching for the identity of the application in an internal table of applications that includes one or more web browser configurations that are associated with each application in an internal table of applications.

10. The method of claim 9, the method including:
responsive to finding the identity of the application in the internal table of applications, substituting at least one associated configuration parameter that is specified by one of the one or more web browser configurations for a default configuration parameter of a web browser such that the web browser renders a requested content of a location specified by a URL based, at least in part, on the at least one associated configuration parameter.

11. A computer system for configuring a web browser executing in a computer to render a web page for display at the computer, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to receive a first hyperlink request from a first program executing in the computer to obtain and render a first web page corresponding to the first hyperlink, and in response, obtain the first web page, and render the first web page according to a first set of web page configuration parameters, wherein one or more configuration parameters of the first set of web page configuration parameters are altered based on one or both of an identity and a type of the first program within which the first hyperlink was selected;
program instructions to receive a second hyperlink request from a second program executing in the computer to obtain and render a second web page corresponding to the second hyperlink, and in response, obtain the second web page, and render the second web page according to a second set of web page configuration parameters, the second set of web page configuration parameters differing in part from the first set of web page configuration parameters in a manner which affects display of the second web page, wherein one or more configuration parameters of the second set of web page configuration parameters are altered based on one or both of an identity and a type of the second program within which the second hyperlink was selected, and wherein the first hyperlink request and the second hyperlink request are received by a web browser control program that configures a web browser based on one or both of an identity of and a type of an application that originates the hyperlink request; and
program instructions to substitute a pointer to a component of the web browser control program for a pointer to a web browser that is included in an operating system registry of the computer.

12. The computer system of claim 11, wherein:
the first program is an instant message program, and the first set of web page configuration parameters specify that image loading is enabled and a scripting language is disabled; and
the second program is an e-mail program, and the second set of web page configuration parameters specify that image loading is disabled and the scripting language is enabled.

13. The computer system of claim 11, the program instructions including:
program instruction to configure one or both of the first set of web page configuration parameters and the second set of web page configuration parameters based, at least in part, on one or more of an identity of a computer user, a list of email addresses, a domain of an email sender, a time of day, a day of week, and an associated content of a hyperlink that has been requested by activation of that hyperlink.

14. A computer program product to adapt a behavior of a web browser behavior to an invocation environment, the computer program product comprising:
one or more computer-readable storage devices and program instructions stored on at least one of the one or more tangible storage devices, the program instructions comprising:
program instructions to receive a first hyperlink request from a first program executing in the computer to obtain and render a first web page corresponding to the first hyperlink, and in response, obtaining the first web page, and rendering the first web page according to a first set of web page configuration parameters configure a web browser control program with one or more configurations of a configurable web browser, wherein one or more configuration parameters of the first set of web page configuration parameters are altered based on one or both of an identity and a type of the first program within which the first hyperlink was selected;
program instructions to receive a second hyperlink request from a second program executing in the computer to obtain and render a second web page corresponding to the second hyperlink, and in response, obtaining the second web page, and rendering the second web page according to a second set of web page configuration parameters, the second set of web page configuration parameters differing in part from the first set of web page configuration parameters in a manner which affects display of the second web, wherein one or more configuration parameters of the second set of web page configuration parameters are altered based on one or both of an identity and a type of the second program within which the second hyperlink was selected, and wherein the first hyperlink request and the second hyperlink request are received by a web browser control program that configures a web browser based on one or both of an identity of and a type of an application that originates the hyperlink request; and program instructions to substitute a pointer to a component of the web browser control program for a pointer to a web browser that is included in an operating system registry of the computer.

15. The computer program product of claim 14, wherein:

the first program is an instant message program, and the first set of web page configuration parameters specify that image loading is enabled and a scripting language is disabled; and the second program is an e-mail program, and the second set of web page configuration parameters specify that image loading is disabled and the scripting language is enabled.

16. The computer program product of claim 14, wherein:

the first hyperlink request and the second hyperlink request are received by a web browser control program that configures a web browser based on one or both of an identity of and a type of an application that originates the hyperlink request.

17. The computer program product of claim 14, the program instructions including:

program instruction to configure one or both of the first set of web page configuration parameters and the second set of web page configuration parameters based, at least in part, on one or more of an identity of a computer user, a list of email addresses, a domain of an email sender, a time of day, a day of week, and an associated content of a hyperlink that has been requested by activation of that hyperlink.

* * * * *